United States Patent
Thierbach

(10) Patent No.: US 8,812,697 B2
(45) Date of Patent: Aug. 19, 2014

(54) METHOD OF CONTROLLING A BROWSER WINDOW

(75) Inventor: Heiko Thierbach, Nürnberg (DE)

(73) Assignee: Koninklijke KPN N.V., The Hague (NL)

( * ) Notice: Subject to any disclaimer, the term of this patent is extended or adjusted under 35 U.S.C. 154(b) by 1447 days.

(21) Appl. No.: 11/991,657

(22) PCT Filed: Sep. 12, 2006

(86) PCT No.: PCT/EP2006/008875
§ 371 (c)(1),
(2), (4) Date: Jul. 30, 2009

(87) PCT Pub. No.: WO2007/039048
PCT Pub. Date: Apr. 12, 2007

(65) Prior Publication Data
US 2010/0017891 A1 Jan. 21, 2010

Related U.S. Application Data

(60) Provisional application No. 60/720,607, filed on Sep. 26, 2005.

(51) Int. Cl.
G06F 15/16 (2006.01)
G06F 21/30 (2013.01)
H04L 29/08 (2006.01)
G06F 17/30 (2006.01)

(52) U.S. Cl.
CPC ............ *G06F 21/305* (2013.01); *H04L 67/143* (2013.01); *G06F 17/30899* (2013.01); *H04L 67/146* (2013.01); *G06F 2221/2119* (2013.01); *G06F 2221/2139* (2013.01)
USPC ............ 709/229; 709/227; 709/228; 713/185

(58) Field of Classification Search
CPC . H04L 67/143; H04L 67/146; G06F 17/3089; G06F 17/30899
USPC .................. 709/223, 203, 227–229; 713/185
See application file for complete search history.

(56) References Cited

U.S. PATENT DOCUMENTS 6,374,359 B1 * 4/2002 Shrader et al. ................ 709/229
7,353,264 B2 * 4/2008 Gill et al. ..................... 709/223

(Continued)

FOREIGN PATENT DOCUMENTS

WO WO 03/069465 8/2003

OTHER PUBLICATIONS

Anonymous, "How do I cookie a popup?", Internet Article, Jan. 16, 2003, pp. 1-8.

(Continued)

Primary Examiner — Ramy M Osman
(74) Attorney, Agent, or Firm — McDonnell Boehnen Hulbert & Berghoff LLP

(57) ABSTRACT

A method of controlling a browser window is disclosed. The method comprises the steps of associating the browser window to a token indicative of a personalized session; and repetitively, verifying said token; and, closing the browser window in dependence of said token. A valid token is generated at startup of the personalized session. The token is invalidated when the user logoffs from the personalized session. Upon detection of an invalid token all browser windows associated with said personalized session will be closed.

11 Claims, 3 Drawing Sheets

(56) References Cited

U.S. PATENT DOCUMENTS

| | | | |
|---|---|---|---|
| 7,702,719 B1 | 4/2010 | Betz et al. | |
| 7,743,153 B2* | 6/2010 | Hall et al. | 709/227 |
| 2002/0162003 A1* | 10/2002 | Ahmed | 713/176 |
| 2002/0178366 A1* | 11/2002 | Ofir | 713/182 |
| 2002/0191020 A1* | 12/2002 | Kaply et al. | 345/764 |
| 2003/0212887 A1* | 11/2003 | Walther et al. | 713/151 |
| 2004/0049673 A1* | 3/2004 | Song et al. | 713/150 |
| 2004/0078604 A1* | 4/2004 | Rice et al. | 713/202 |
| 2004/0148251 A1* | 7/2004 | Kavoun | 705/39 |
| 2005/0132222 A1* | 6/2005 | Petrovic | 713/201 |
| 2005/0267981 A1* | 12/2005 | Brumley et al. | 709/232 |
| 2005/0278537 A1* | 12/2005 | Kirkland et al. | 713/182 |
| 2006/0020783 A1* | 1/2006 | Fisher | 713/156 |
| 2006/0036875 A1* | 2/2006 | Karoubi | 713/190 |
| 2006/0069785 A1* | 3/2006 | Barrett | 709/229 |
| 2006/0070012 A1* | 3/2006 | Milener et al. | 715/822 |
| 2006/0075110 A1* | 4/2006 | Seraphin | 709/227 |
| 2006/0080646 A1* | 4/2006 | Aman | 717/143 |
| 2006/0106738 A1* | 5/2006 | Schleicher | 705/401 |
| 2007/0169175 A1* | 7/2007 | Hall et al. | 726/3 |
| 2007/0289004 A1* | 12/2007 | Chao et al. | 726/9 |

OTHER PUBLICATIONS

R. Rajamony, "Measuring client-perceived response times on the WWW", Proceedings of the Third Usenix Symposium on Internet Technologies and Systems, San Francisco, Mar. 26, 2001, pp. 185-196.

D. Jesook, "Close window as it loads", Internet Article, Sep. 17, 2002, pp. 1-2.

* cited by examiner

METHOD OF CONTROLLING A BROWSER WINDOW

FIELD OF THE INVENTION

The present invention relates to a method of controlling a browser window. The invention further relates to a server device communicating with a client device and arranged to enable the control a browser window on a client device. The present invention further relates to a computer program enabling the control of a browser window.

PRIOR ART

Today, a web browser offers the possibility to run applications or to present data within more than one browser window. For example, in the first browser window the start page of a portal application is presented, while a second browser window is opened by another application from a user activity or automatically. From the second window a third window can be opened and used, and so on. This leads to the situation, that a lot of browser windows could be opened and simultaneously used on the client computer.

Portal applications may offer the possibility to identify a user. By a login mechanism e.g. the user is identified and a personalized session is started. A personalized session is the time period between a user login and a user logout, or more general the time period while a user is known, in which a user can perform private actions on the client computer. The obtained user identity could be transferred to other applications, e.g. by sending the user identity data to the other application via TCP/IP, so that the user does not need to authenticate himself again in another application related to the same personalized session. In this scenario the user is already known and could access personal data within different applications, e.g. emails, bills, cost control. Similarly, in said personalized session, the user is enabled so as to perform payments, purchases, sales or other private actions without authenticating himself in each of said applications after starting a personalized session.

At the end of a personalized session, it is recommended, that the user leaves the status "login" to become "logged out" from all portal applications he is using before. In practice, a log-out function is offered within every application, which informs the applications and a centralized authentication instance, that the personalized session has become invalid on a user request. For example, after logging on to an auctioneering site like EBAY, a user can open multiple windows and perform actions without authentication. However if the user logs off from in one of the windows, the other windows remain open and assume that the personalized session is still active. To perform in one of the windows a private action such as putting a bid on an item, he first has to login again.

Different implementations of portals exist today. Known portal implementations offer the possibility to run all applications within only one browser window (e.g. using the frame technology) or open multiple windows which are not closed concurrently after a user requests to log out.

SUMMARY OF THE INVENTION

The present invention seeks to provide an improved method of controlling a browser window.

According to an aspect of the present invention, the method of controlling a browser window comprises the steps of associating the browser window to a token indicative for a personalized session; verifying said token repetitively; and closing the browser window in dependence of said token. Using a token indicative for a personalized session allows indicating for multiple applications in multiple windows whether the user is still logged on to said personalized session. Each of the browser windows belonging to said personalized session can monitor the token. A change in the status of the personalized session made in any of the applications can be applied to the token. As soon as the token indicates that the user has been logged off, a browser window belonging to said personalized session can detect this and can perform the corresponding action like closing the browser window.

In a further embodiment of the invention the method further comprises the step of deleting said token initiated by logging out from said personalized session. Deleting the token can be a simple and secure mechanism to indicate to all the windows associated with the personalized session that the user has signed off and the window has to be closed. Even when the token was deleted accidentally by any application not associated with the personalized session, all the windows can be closed so as to protect the user for unauthorized use of any of the browser windows associated with the personalized session.

In a further embodiment of the invention the method further comprises the step of generating a frame for performing verifying said token repetitively; and closing the browser window in dependence of said token. Using a specific frame in the browser window to perform said actions, allows easy programming of the other frames. A software engineer does not take into account that his software in a frame of said windows performs the corresponding action. In an embodiment of the invention said frame for performing verifying said token repetitively; and closing the browser window in dependence of said token, is an invisible frame. Using an invisible (or hidden) frame allows controlling the browser window without bothering the user with the existence of said frame.

In a further embodiment of the invention, the method further comprises generating said token on starting said personalized session. By generating the token at the starting of a personalized session and associating the browser window to said token, an unambiguous and uniform manner for controlling the browser windows associated with the personalized session has been found.

In a further embodiment of the invention, the token is generated in a further browser window, and on generation of the browser window from the further browser window, the browser window is associated with the token generated in the further browser window. Using this embodiment ensures that after a token has been generated in a browser window, all subsequent browser windows which were opened by an user action said browser window can be associated with said token. In this way a new browser window started from a browser window associated with a personalized session can automatically be associated with said personalized session and consequently be closed as soon as in any of the browser windows the user logged out from said personalized session.

The present invention further seeks to provide a server device arranged to communicate with a client and adapted to enable the control of browser windows on the client device. The server device according to the invention comprises a storage unit carrying a first program configured to start a personalized session and a second program to be executed in a browser window on the client device, wherein the first program is arranged to generate a token indicative of a personalized session and the second program is arranged to perform the method of controlling the browser window, the method comprising the steps of associating the browser window to the token indicative of the personalized session; verifying said token repetitively; and closing the browser window in dependence of said token. In a first exemplary embodiment of the server, the first program is configured to store the token in a memory unit of the client device. In a second exemplary embodiment of the server, the first program enables to store the token in the storage unit of the server device.

The present invention further seeks to provide a client device arranged to communicate with a server device. The client device is adapted to control a browser window. The server device comprises a storage unit carrying a first program enabling to start a personalized session and a second program to be executed in the browser window on the client device. The first program is arranged to generate a token indicative of a personalized session and the second program is arranged to perform the method of controlling the browser window, the method comprising the steps of associating the browser window to the token indicative of the personalized session; verifying said token repetitively; and closing the browser window in dependence of said token.

The present invention further seeks to provide a computer program product comprising computer executable instructions which instructions when executed on a computer system perform the method of controlling a browser window, the method comprising the steps of associating the browser window to the token indicative of the personalized session; verifying said token repetitively; and closing the browser window in dependence of said token.

SHORT DESCRIPTION OF DRAWINGS

The present invention will be discussed in more detail below, using a number of exemplary embodiments, with reference to the attached drawings, in which FIG. 1 shows schematically a pc-screen with a number of browser windows.

DETAILED DESCRIPTION OF EXEMPLARY EMBODIMENTS

For the purpose of teaching of the invention, preferred embodiments of the method and system of the invention are described below. It will be apparent to the person skilled in the art that other alternative and equivalent embodiments of the invention can be conceived and reduced to practice without departing from the true spirit of the invention, the scope of the invention being only limited by the claims as finally granted.

Figure 1:
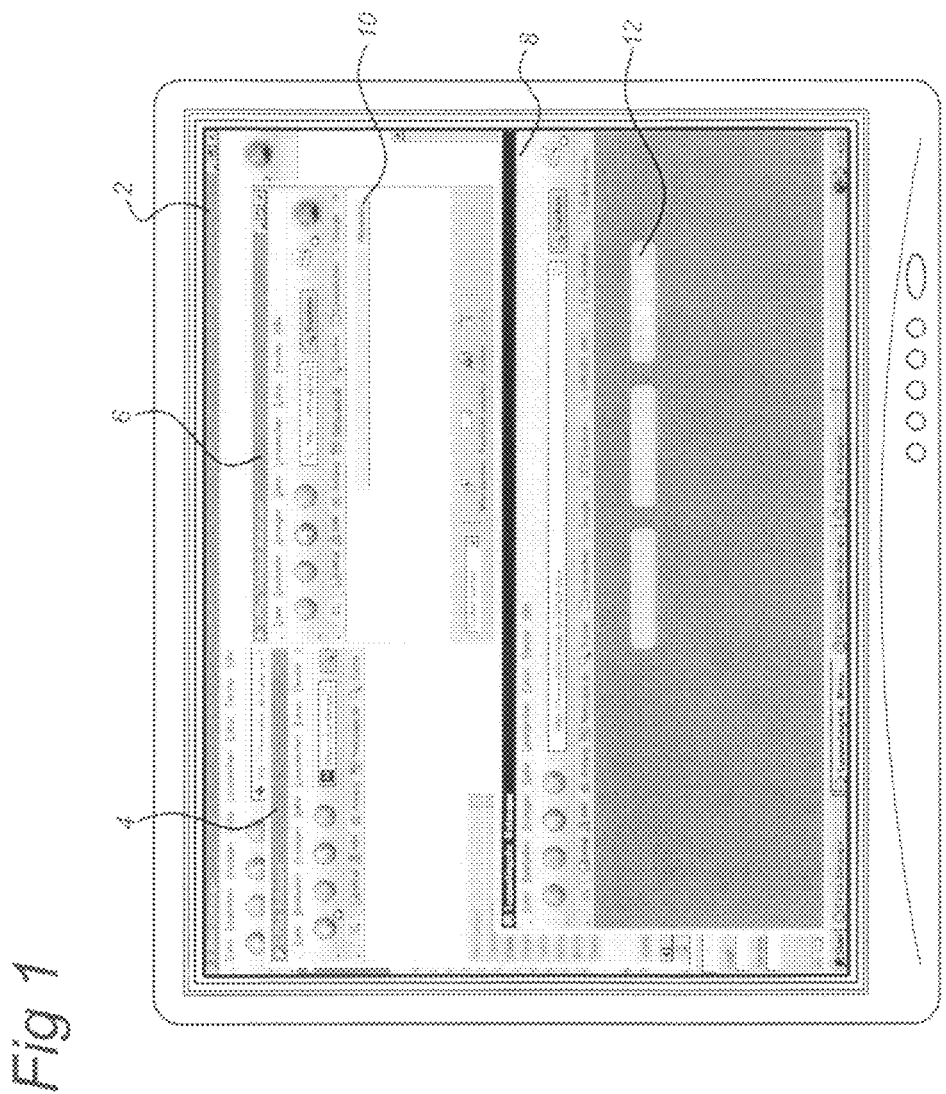

FIG. 1 shows schematically a pc-screen with a number of browser windows. The shown pc-screen is an example of a pc-screen that could be visible today. In the example a browser window 2 at the background of the screen is the browser window to logon to an internet portal web site so as to start a personalized session. An Internet portal Web site is intended to be the first Web site a user will find or use when seeking information or a service from a particular organization. It provides guidance to users for finding information, using electronic services, and sending questions and comments. Portals provide a broad array of resources and services, including a directory of other Web sites, a facility to search for other sites, news, e-mail, phone and map information, and sometimes a community forum. A personalized session is all the data exchange between the client computer and a service provider, starting when the connection is established by logging on by authentication of a user and ending when connection terminates by logging off.

After logging on to the portal web site the user can start another application, either from the portal website or from any other application source. Each new application is started in a new browser window. As the user is logged on to the portal web site, the user doesn't have to authenticate himself to start any new application to access personal data. In browser window 4, for example, a bank account application is started, in browser window 6 an email application and in window 8 an "i-mode" application. "i-mode" is a proprietary packet-based information service that delivers information, such as mobile banking and cartoons, to mobile phones and enables the exchange of email from handsets. Each of the browser windows 2, 4, 6, 8, which all belong to the same personalized session, has a possibility 10, 12 to log off from the portal web site. As soon as a user decides to log off, all the browser windows belonging to the personalized session will be closed. By means off the flow charts in FIG. 2 and FIG. 3 an embodiment of the present method of controlling said browser windows will be discussed in more detail.

Figure 2:
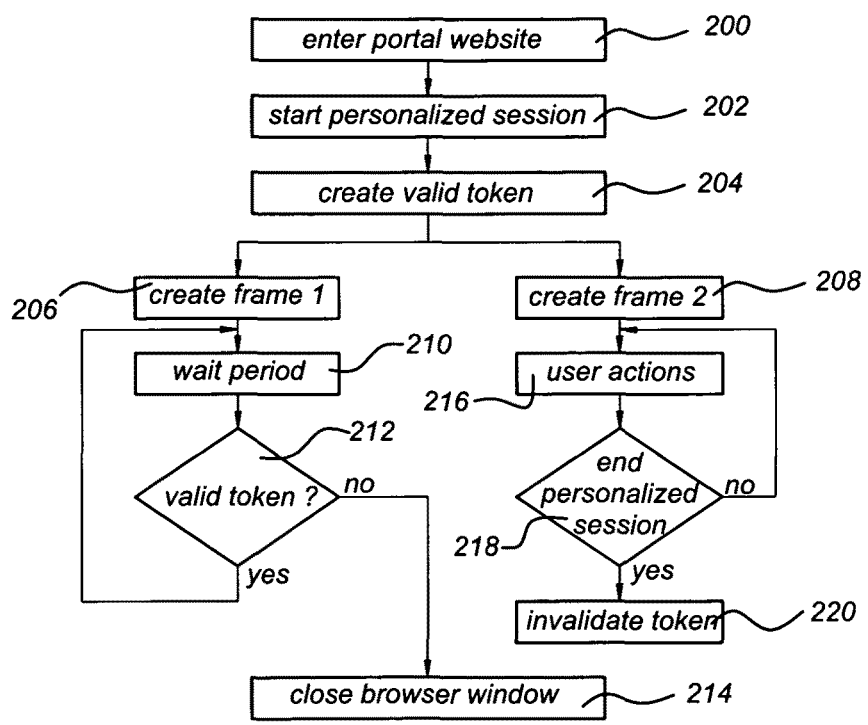
FIG. 2 is a flowchart for a first method of controlling a browser window.

FIG. 2 is a flow chart of a first embodiment of the method of controlling a browser window. Controlling a browser window is e.g. the opening and/or closing of the browser window. Another example of controlling a browser window is placing the browser window at a specific x-y location. Yet another example of controlling a browser window is setting or changing the size of the browser window. Assumed is that the user already opened a browser window. In state 200 the user entered the portal web site. This could for example be done by entering or selecting the corresponding URL in the browser window. Normally, in the browser window the user could enter his username and password to authenticate the user to the web site. The authentication is performed in state 202 and the personalized session is started. Subsequently, a valid token is generated in state 204. The token could be part of a common data set, which is available within the browser environment. The token is created by a portal application after successfully authentication of a user. A cookie could be used as a token container on the client computer. The token could also be data stored on a server of the website as a webpage. In this case, the token could be accessible via an URL. The token could for example be a file with a specific file name or a specific data in a specific file. A token is considered valid if the token corresponds with a predefined definition. The token could be valid through its existence or similarity with a predefined value or sequence of characters.

After the token is created a first frame is created in state 206 and a second frame is created in state 208. A frame is a format for web documents that divides the screen into segments, each with a scroll bar as if it were as "window" within the browser window. Preferably, the first frame is invisible or unnoticeable by the user ('hidden frame'). In the first frame a piece of software is included which repetitively waits a period of time 210 and verifies the validity of the token 212 until the token becomes invalid. When the token is detected to be invalid, the browser window is closed in state 214. In an exemplary embodiment of the method the period of time between two subsequent verifications is 2 seconds.

The following code snippet shows a reference implementation:

```
<script language="JavaScript">
    function wait( ) {
```

-continued

```
        // call the function token after 1 second
        windows.setTimeout("token( )", 1000);
        }
    function token( ) {
        // check, if the token is still present
        if (document.cookie.indexOf("anystring") != −1) {
            // do nothing
        } else {
            // close the window
            self.close( );
        // call the function wait after 1 second
        windows.setTimeout("wait( )", 1000);
        }
</script>
```

In this example, the token is linked to a HTTP (Hypertext Transfer Protocol) cookie.

The script above is to be implemented within the frame document as follow:
<html>
...
<body onload=wait( )>
...
</html>

In the second frame a portal application is started with the corresponding user actions 216. Normally, one of the actions a user can perform in a portal application is to log off from the portal application. This corresponds with the ending of the personalized session 218. If the user decides to end the personalized session, the token will be invalidated 220. How the token has to be invalidated depends on the implementation. The token can be invalidated by deletion of the file of webpage or by changing the value or sequence of characters in a file or webpage.

Figure 3:
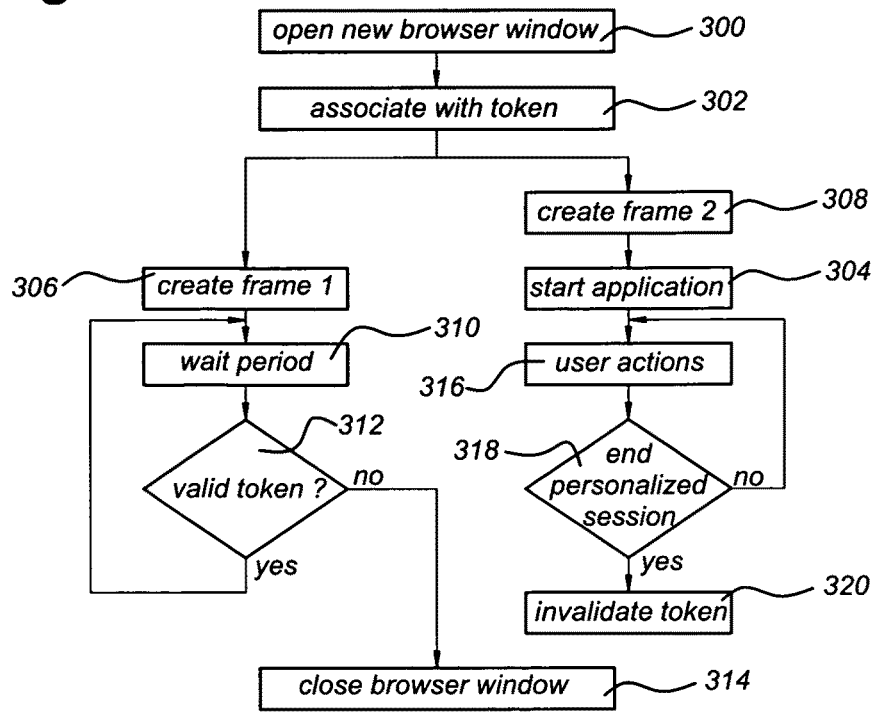
FIG. 3 is a flowchart for a second method of controlling a browser window.

It should be noted that not always the second frame has to be created. The portal application could be started in a frame that already exists in the browser window. One of the user actions that can be performed in state 216 is to start another portal application in a new window. FIG. 3 is a flowchart for a further embodiment of the present method of controlling said new browser window. In state 300 the browser window is created on the screen. As the browser window is created by an action of a personalized session, the browser window is associated with the token 302. Said token corresponds to the token of the browser window in which the action to open the new browser window is performed. Subsequently in the browse window a first frame and a second frame is created in the browser window, corresponding to state 306 and 308 respectively. The first frame could be invisible or unnoticeable be the user.

In the first frame a piece of software is included which repetitively waits a period of time 310 and verifies the validity of the token 312 until the token becomes invalid. When the token is detected to be invalid, the browser window is closed in state 314. In an exemplary embodiment of the method the period of time between two subsequent verifications is 2 seconds.

In the second frame the requested portal application is started in state 304. The user can perform the desired user actions 316. Normally, one of the actions a user can perform in a portal application is the log off from the portal application. This corresponds with the ending of the personalized session 318. If the user decides to end the personalized session, the token will be invalidated 320. How the token has to be invalidated depends on the implementation. The user could also perform the user action to start another portal application in a new browser window. For this window the method according to the flow chart in FIG. 2 may be used.

FIG. 2 differs from FIG. 3 in that the creation of the token is shown in the embodiment of FIG. 2 and the association with an already present token is shown in the embodiment of FIG. 3. After the token to be verified in the browser window is determined, both flow charts use the same software to control the browser window. As all browser windows belonging to the same personalized session verify the same token, all browser windows will be closed as soon as the token is invalidated. In this way a very simple but effective method is presented to control browser windows belonging to the same personalized session.

Figure 4:
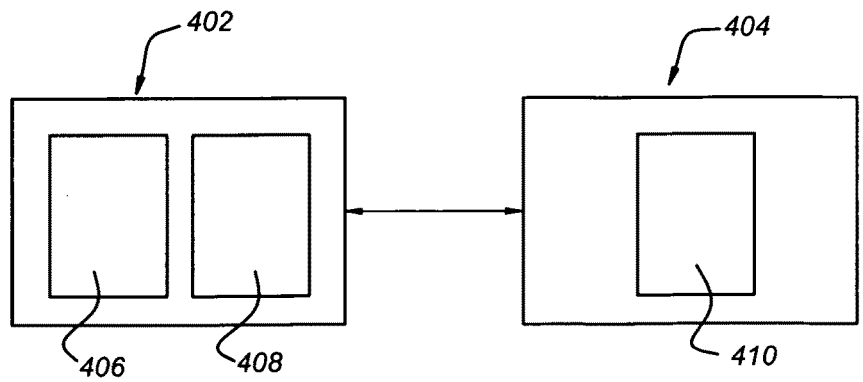
FIG. 4 shows schematically a computer system arranged for controlling a browser window on a client device.

FIG. 4 shows schematically a system arranged for controlling a browser window. The system comprises a server device (404) and a client device (402). The server device (404) is a computer system of a service provider which enables via portal applications the retrieval and maintenance of personal data. The personal data is preferably only accessible in a personalized session. The server device comprises a storage unit (410) carrying a first program enabling to start a personalized session. The storage unit (410) could be any mass storage medium, such as a hard disc or array of hard disks. In case of multiple hard disks, the disks could be located in different locations and the service device (404) according to the invention is intended to encompass all said hard disks. The storage unit (410) carries further programs to be executed in a browser window on the client device (402). The further programs could be in any computer language that is suitable to be executed in a browser window. By means of the further programs a user can start a diversity of portal applications, such as email, bills, cost control, reservations, web browsing, etc.

The client device (402) is arranged to retrieve a further program from the server device and comprises a memory unit (408) arranged for storing said further program. Examples of a client device are PC, laptop, notebook, PDA, mobile phone, etcetera. The memory unit (408) could be an internal memory or a hard disk or any other data storage device. The client device (402) further comprises a processing unit (406) arranged for executing said further program.

By means of the first program a user starts a personalized session and generates a token indicative of said personalized session. By means of a further program the user can use a portal application. The further program associates the browser window in which the portal application is started, with the token of the corresponding personalized session. The further program further enables to verify repetitively the validity of the token and closes the browser window in dependence of the validity of said token. The token could be a cookie stored in the memory unit (408) of the client device. Consequently, is the first program arranged to store the token in the memory unit (408) of the client device (402) and is the second program arranged to verify the validity of said token stored in the memory unit (408). The token could also be a webpage stored in the storage unit (410). Consequently, is the first program arranged to store the token in the storage unit (410) of the server device (404) and is the second program arranged to verify the validity of said token stored in the storage unit (410).

Several embodiments of the invention have been described above by way of exemplary embodiments. Various modifications and variations for the elements described with respect of these embodiments may be made by the skilled person without departing from the scope of the present invention, which is defined by the appended claims. For example, the term browser window is not intended to be limited to a program to view HTML documents, but could be any software to have multiple windows on a screen, wherein in a window multiple tasks can run simultaneously. In this case there is no need to generate the first and second frame in a browser window.

The invention claimed is:

1. A method of controlling a browser window comprising the steps of:
    associating the browser window to a token indicative of a personalized session;
    verifying repetitively that said token is still valid; and
    closing the browser window in case of invalidity of said token.

2. The method according to claim 1, further comprising the step of:
    deleting said token triggered by logging out from said personalized session.

3. The method according to claim 1, further comprising the step of:
    generating a frame, the frame being a segment of said browser window, for performing verifying repetitively that said token is still valid.

4. The method according to claim 3, wherein said frame is an invisible frame.

5. The method according to claim 1, further comprising the step of:
    generating said token on starting said personalized session.

6. The method according to claim 1, wherein the token is generated in a further browser window, and on generation of the browser window from the further browser window, the browser window is associated with the token generated in the further browser window.

7. A server device arranged to communicate with a client device and adapted to enable the control of a browser window on the client device, the server device comprising a storage unit carrying a first program enabling to start a personalized session and a second program to be executed in the browser window on the client device, wherein the first program is arranged to generate a token indicative of a personalized session and the second program is arranged to perform the method of controlling the browser window, the method comprising the steps of:
    associating the browser window to the token indicative of the personalized session;
    verifying repetitively that said token is still valid; and
    closing the browser window in case of invalidity of said token.

8. The server device according to claim 7, wherein the first program enables to store the token in a memory unit of the client device.

9. The server device according to claim 7, wherein the first program enables to store the token in the storage unit of the server device.

10. A client device arranged to communicate with a server device and adapted to control a browser window, the server device comprising a storage unit carrying a first program enabling to start a personalized session and a second program to be executed in the browser window on the client device, wherein the first program is arranged to generate a token indicative of a personalized session and the second program is arranged to perform the method of controlling the browser window, the method comprising the steps of:
    associating the browser window to the token indicative of the personalized session;
    verifying repetitively that said token is still valid; and
    closing the browser window in case of invalidity of said token.

11. A computer-readable media for storing instructions, the instructions executable by a processor for executing a method of controlling a browser window, the method comprising the steps of:
    associating the browser window to a token indicative of a personalized session;
    verifying repetitively that said token is still valid; and
    closing the browser window in case of invalidity of said token.

* * * * *